United States Patent
Smith et al.

(10) Patent No.: US 12,380,014 B1
(45) Date of Patent: Aug. 5, 2025

(54) ROBOT FIRMWARE AND HARDWARE PERFORMANCE QUALIFICATION TOOL

(71) Applicant: Amazon Technologies, Inc., Seattle, WA (US)

(72) Inventors: Nicholas A. Smith, Medford, MA (US); Oliver Purwin, Andover, MA (US); Charles Linton, Southborough, MA (US)

(73) Assignee: AMAZON TECHNOLOGIES, Seattle, WA (US)

( * ) Notice: Subject to any disclaimer, the term of this patent is extended or adjusted under 35 U.S.C. 154(b) by 115 days.

(21) Appl. No.: 18/225,968

(22) Filed: Jul. 25, 2023

(51) Int. Cl.
*G06F 11/00* (2006.01)
*G06F 8/61* (2018.01)
*G06F 11/34* (2006.01)

(52) U.S. Cl.
CPC ............ *G06F 11/3476* (2013.01); *G06F 8/61* (2013.01); *G06F 11/3452* (2013.01)

(58) Field of Classification Search
CPC ............. G06F 11/3476; G06F 11/3452; G06F 11/1471; G06F 11/3457
See application file for complete search history.

(56) References Cited

U.S. PATENT DOCUMENTS

2022/0091973 A1*  3/2022  Atmeh ................ G06F 11/3086

FOREIGN PATENT DOCUMENTS

CA           2849739 A1 *  3/2013  ....... G05B 19/41895

* cited by examiner

Primary Examiner — Katherine Lin
(74) Attorney, Agent, or Firm — K&L Gates LLP

(57) ABSTRACT

In various examples, systems and methods for qualification of robotic firmware are described. In various examples, first firmware or first hardware may be deployed on a first set of robots and second firmware or second hardware may be deployed on a second set of robots. The first firmware may generate first log data and the second firmware may generate second log data during operation of the first and second set of robots during a first time period. A first value of a first performance metric may be determined using the first log data and a second value of the first performance metric may be determined using the second log data. The second firmware or the second hardware may be modified based at least in part on the first value and the second value.

20 Claims, 10 Drawing Sheets

ROBOT FIRMWARE AND HARDWARE PERFORMANCE QUALIFICATION TOOL

BACKGROUND

In a heterogeneous robotic processing facility, robotic drive systems can be used to move items and/or containers of items from one location to another. Robotic arms can be used to sort items by removing an item from one location and placing the item in a different, target location. Systems of such robots can be designed and deployed to accomplish a variety of tasks such as item retrieval, processing, and sortation. Firmware is installed on such robots to provide interoperability between software and robot hardware.

DETAILED DESCRIPTION

Figure 1A:
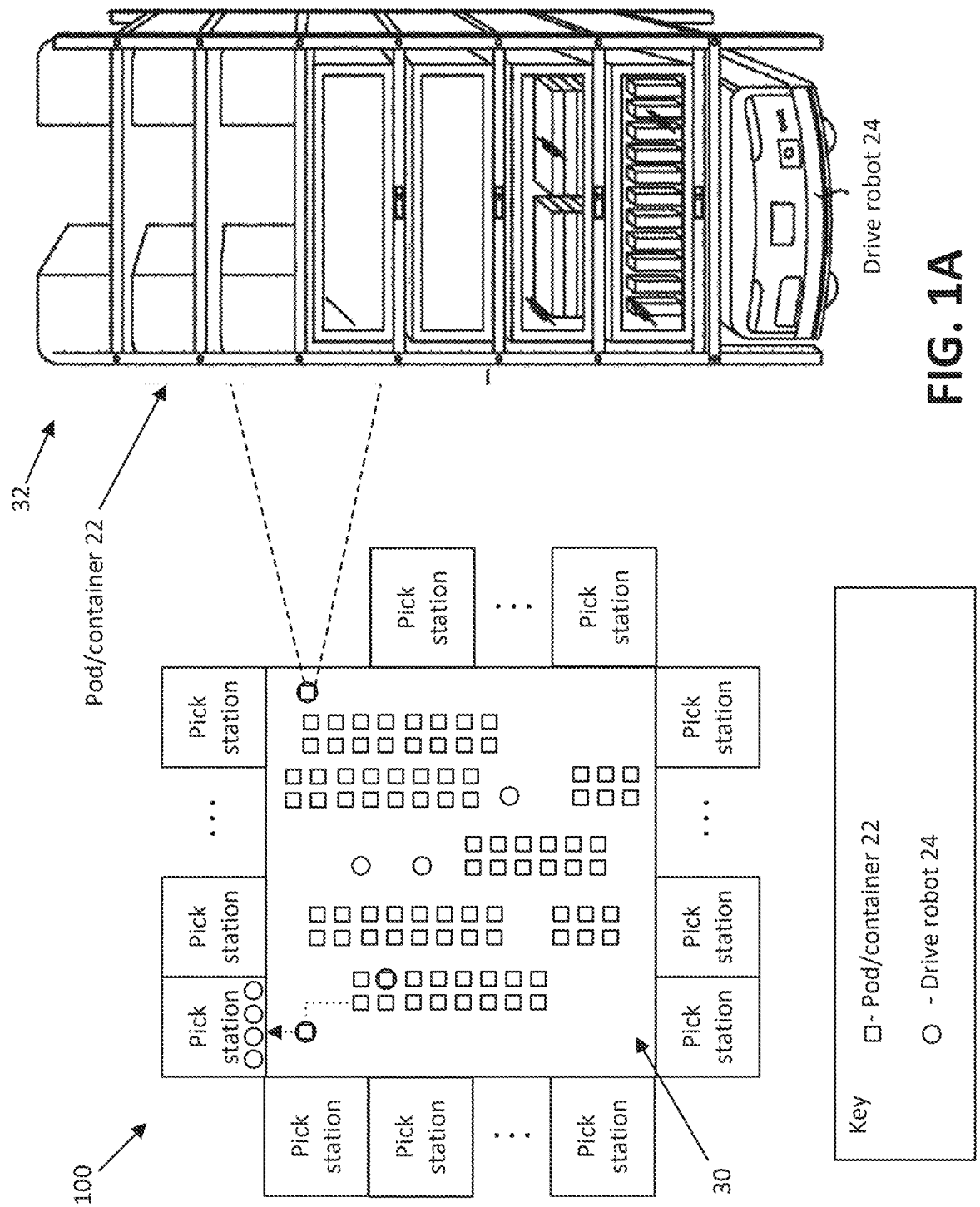
FIG. 1A is a diagram of an example of a robot-controlled storage field and pick stations, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic picking and sortation systems may be used in large-scale inventory processing environments in which a large number of items are received, processed, sorted, and sent out. For example, large-scale delivery and inventory management systems may use fulfillment centers and other large warehouses that may serve as part of the supply chain and can serve as a hub for logistics and processes used to get items from third party sellers to the purchaser. In some cases, received items at a robotic fulfillment center may be placed in robot-controlled storage fields. For example, items may be stored in containers (sometimes referred to as "pods"). When an item is ordered and needs to be processed for shipment, instead of having a human worker find and walk to a storage shelf in a warehouse to "pick" the item, robotic drives may be controlled to select the pod (or other container) storing the item and may transport the pod to a pick station where a worker or another robot may pick the item from the pod and send the item for downstream processing. After items in such facilities are packaged and addressed for delivery, the packages may be sorted into carts and/or other containers, with the packages in a single container being destined for the same delivery location. Accordingly, in some examples, there may be a distinction between different robot-controlled operations in such facilities. A "picking" operation may refer to robots moving a pod from a robot-controlled storage field to a pick station and/or selection of the item at the pick station. A "sortation" operation may be downstream of the "picking" operation and may refer to sorting items and/or packages of items into carts or other containers that are bound for the same truck, freight unit, or other "destination." In some examples, such containers may be said to be "destination pure" as all items within the container may be destined for the same downstream location (whether such location is an intermediate location, such as a warehouse or last-mile delivery center, or the terminal location (e.g., a delivery address of a purchaser)). It should be noted that sortation may be used in other contexts beyond commercial delivery systems and in general may be used whenever heterogeneous items are to be sorted along some dimension of sortation (e.g., type, class, size, delivery destination, color, functionality, etc.). Accordingly, although many of the examples described herein use a package delivery example, the various dynamic allocation techniques used to control robotic resources may instead be deployed in other object-picking and/or sortation contexts.

A variety of different robots may be deployed in such facilities with different robots having different tasks. For example, drive robots may be tasked with lifting pods and removing them from a storage field when an item carried by the pod needs to be processed for an order. The drive robots may use cameras and computer vision to evaluate fiducial markings on a floor of the facility and/or to detect other robots and/or obstacles in order to navigate within the facility to the correct destination. In some other examples, picking and/or sortation robots may use robotic arms and/or gantries to select items from one location (e.g., a container on a pod, from within a tote, from a shelf on a cart, etc.) and place the items in another location.

Accordingly, logistic operations within such facilities may be powered by a fleet of differential-drive robots. Depending on the specific fulfillment center (or other facility) and the specific drive chassis configuration, these robots may interact with pods, totes, package resources, etc., in a semi-structured environment. These resources are transported from one physical location to another in a complicated orchestration of software and robotic drive unit activities.

At the core of the robotic drive units' functionality (as well as other robotic units such as sortation arms) is the firmware that controls their sophisticated behaviors; from the commutation of electro-mechanical systems, to sensor perception, to receiving commands from coordinating software systems and converting them into distinct motion primitives. Software services may allocate drives units to specific missions (using wireless control instructions), work to mitigate congestion, and provide high-level routes to execute those missions. However, everything else is the responsibility of the code executing on the hardware embedded on the drive unit—the firmware.

In order to add new features or capabilities to the drive units, adjust existing behaviors, address bugs, etc., new firmware and/or hardware may be periodically released to this massive robotic fleet. For modern chassis, new and/or modified firmware and/or hardware may be deployed (e.g., pushed to robotic units and installed in the case of firmware) at a semi-regular rate (e.g., once a quarter). In addition, there may be irregular 'emergency' releases to address critical issues and/or provide patches, as necessary.

However, as the size and diversity of robotic fleets in such facilities continues to grow, it becomes more and more difficult to ensure that alterations to the shared firmware code databases will not introduce unanticipated side effects elsewhere. For example, among different robot types and/or robot roles, there may be incompatible hardware revisions. Within these hardware revisions, there may be natural manufacturing variants. The complicated nature of the firmware system requirements and the vastness of possible real-world situations a robot might encounter makes exhaustively testing all possible configurations, scenarios, and variants infeasible. In order to ensure continuing reliable operation of drive units, robotic firmware and/or hardware qualification tools are described herein that are able to provide comprehensive and extensible evaluations of prospective robotic firmware/hardware releases to detect unintended and/or aberrant robotic behavior which may be correlated with a new firmware/hardware release.

In various examples described herein, statistical hypothesis testing may be applied to fleets of robots (e.g., robotic drive units) as an automatic quality assurance mechanism for firmware/hardware (or software) modification on large fleets of robots. The firmware, hardware, and/or other software executing on the robots may generate log data during robot operation that describes errors (e.g., navigation errors, locomotion errors, software errors, etc.), warnings, informational events, parameter data that may be used to determine events, rates of events, conditions, etc. In some previous examples, key metrics of overall facility functionality are monitored (e.g., throughput of the facility, average robot queuing time at various work stations, etc.). However, monitoring at such a high level may be insufficient for purposes of evaluating robot firmware/hardware releases, as alarms at the facility level may fail to reliably proactively prevent failures (e.g., crashing throughput rates means the site is already in crisis).

Given the complexity of the system, overall fulfillment center (FC) metrics may obscure issues that impact only a portion of the drive unit population. For example, if only a subset of robotic drive units are upgraded with new firmware and/or hardware, the unmodified drives may compensate for degraded performance in the upgraded population. Highly-automated FCs, such as those described herein, may experience different load and/or processing demands over time as the number of items to be picked and/or sorted for a given item order load may be highly variable (e.g., due to time of day, day of week, seasonality, variable user demand, etc.). In some instances, a processing bottleneck may occur due to robot congestion, order volume, buffer overflow, etc. For example, a surge in item orders may cause a bottleneck in the number of robots available to transport pods to picking stations and/or may cause congestion on the processing floor where such robots must avoid collisions with one another. However, monitoring such overall FC metrics may not reveal niche environmental interactions (such as floors that are more slippery at one site relative to another) that later are exposed, en masse, as FC circumstances change (e.g., due to order volume fluctuation, seasonality effects, etc.).

Instead, in various techniques described herein, the emergent behavior of individual samples (e.g., subsets of robots on which a new firmware release has been deployed) are evaluated within a large population of robotics drives. Such evaluations provide more fine-grained information relative to monitoring a change in overall FC performance due to firmware or hardware upgrades/changes. Pre-existing within the deployed robotic system, there may be log data event reporting systems intended to aid in operator understanding of individual robotic drive behavior and/or to enable engineers to quantify individual robotic drive adherence to certain structured operations (e.g., accuracy of navigation during motion, battery temperatures during charging, etc.). The log data may be used to track and evaluate performance metrics (including drive errors, events, parameters, etc.).

In the various systems and techniques described herein, these existing signals (e.g., log data reported by individual robots) may be used as an automatic alarming system by evaluating occurrence-rates (in the case of log data events) and key performance features (in the case of detailed robot operations/information reported in the log data) and considering changes in statistical characteristics (means, characteristics of distribution, etc.).

In some situations, this can be conducted even without specific expert understanding regarding the nature of the circumstances in which these events or features are normally generated. This allows for a truly 'unsupervised' evaluation of firmware/hardware candidate fitness; no human expertise required; no human attention limitations on the onerous evaluation of massive amounts of data.

In the various systems and techniques described herein, firmware and/or hardware release candidates may follow existing practices such as engineering verification on a very limited set of test hardware, followed by a more extensive quality-assurance testing on a small test environment. However, with the techniques discussed herein, full release may be gated by the unsupervised production experiments described herein. For example, some small population of robots will be automatically selected and upgraded to the firmware/hardware release candidate. They will then be allowed to operate for some set amount of time in parallel to legacy systems, across one or more deployment zones (e.g., a shared operating zone).

Because both these robot populations will be simultaneously operating on identical environments, the substantial environmental variances can be controlled for while isolating the variables of concern such as the modifications to firmware operational logic, peripheral interactions, and even the underlying kernel system. Anomalies and unexpected system behavior and/or operation changes can be flagged automatically using statistically significant differences between the test and control robot populations, without engineering/human involvement. Accordingly, when aberrant robot behavior is detected in the test sample, full deployment of the prospective firmware release (e.g., to the full robot population) may be automatically prevented/delayed.

In some further examples, test and control robot populations may be deployed across a plurality of different processing environments (e.g., FCs, sortation centers, processing facilities, etc.) and the number of test robot samples may be increased in size for subsequent evaluations. Limiting the exposure of a particular facility to a relatively small test group of robots may reduce risk for the individual sites and may increase the coverage of the test across multiple sites. However, in other examples, a single processing environment may be used, as desired. Although the examples described herein often discuss fulfillment centers, the robotic firmware qualification techniques described herein are applicable in any environment in which a large number of robotic resources are deployed (such as in inventory management, manufacturing, etc.).

FIG. 1A is a diagram of an example of a robot-controlled storage field and pick stations 100, according to various aspects of the present disclosure. In the example robot-controlled storage field and pick stations 100, a storage field 30 comprises pods/containers 22 and drive robots 24. Drive robots 24 may be configured to navigate the storage field 30 to locate specified pods/containers and may move the pod/container to a specific pick station. As shown, the pick stations may be located along the perimeter of the storage field 30 (e.g., for safety) although, other implementations and/or floor plans may be used, as desired. As shown in image 32, the drive robot 24, in some examples, may drive under the pod/container 22 and may lift the pod/container and navigate to the appropriate pick station. A human and/or another robot at the pick station may locate the relevant item or items from the pod/container 22 (e.g., according to an item order list) and may remove those items for further processing. The drive robots 24 (robotic drive units) may include various sensors and may navigate the robot-controlled storage field using computer vision by detecting fiducial markings on the floor of the facility as well as based on object detection. The drive robots 24 may generate log data describing informational events, errors, warnings, etc., during operation and may transmit this information to a release qualification tool 202 (e.g., a firmware release qualification tool or a hardware release qualification tool) during the testing of a new firmware release, as described in further detail below. Although qualification of firmware releases is described in many examples herein, it should be noted that the techniques are equally applicable to hardware release qualification.

Figure 1B:
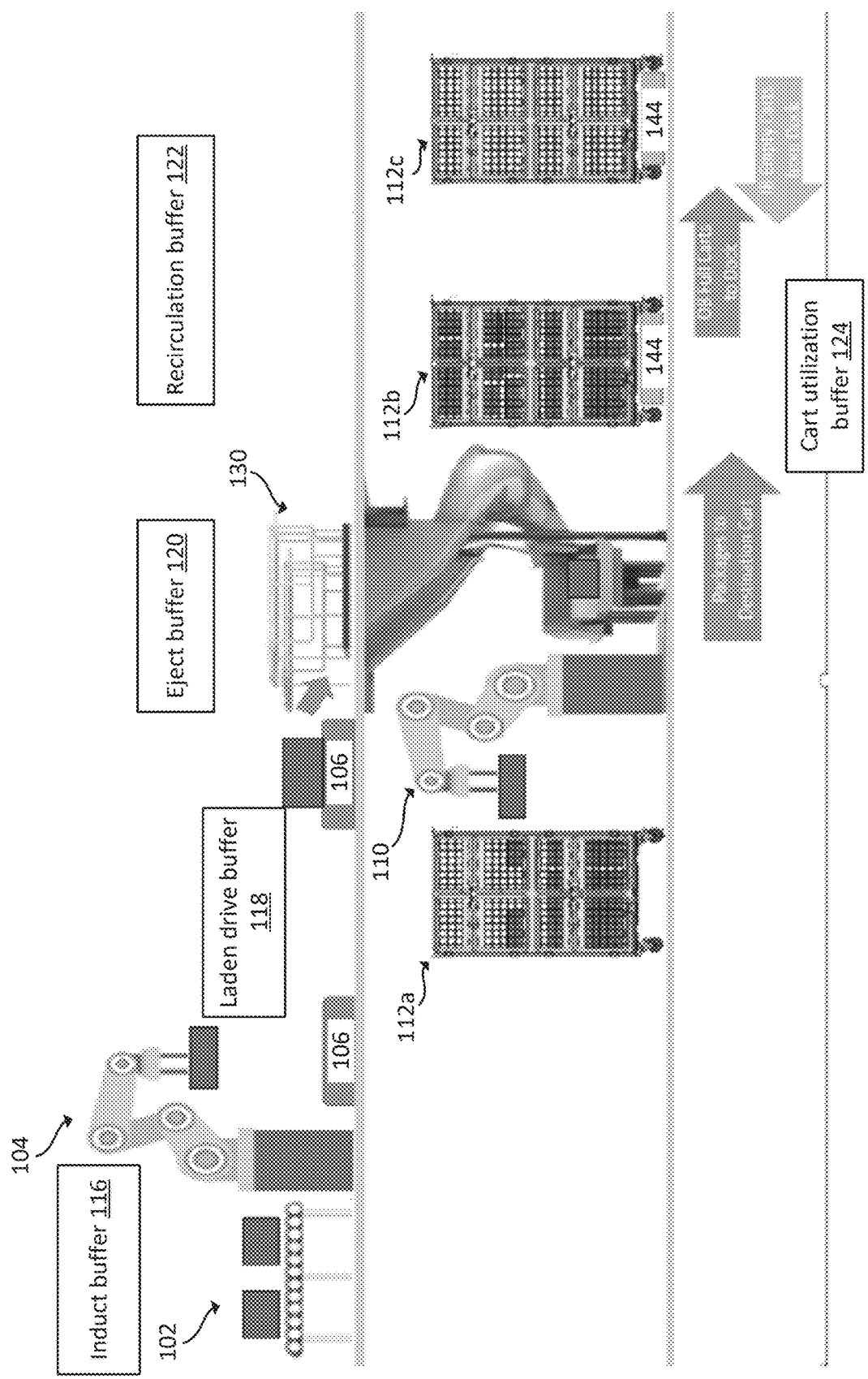
FIG. 1B is a diagram of an example robotic sortation system, according to various aspects of the present disclosure.

FIG. 1B is a diagram of an example robotic sortation system that may be used for sortation in a fulfillment center, according to various aspects of the present disclosure. In the example of FIG. 1B single (or limited) instances of various buffers and robotic resources are shown for illustrative purposes; however, it should be noted that an actual sortation facility may include multiple such instances (e.g., tens, hundreds, or thousands), as further described below. In the example depicted in FIG. 1B, items may have previously been packaged and/or labeled (e.g., labeled with destination labels that indicate a target destination for the individual labeled packages) and may be placed on an induct buffer 116. An induct buffer 116 may store packages until such packages are picked up by robotic sortation device 104 and placed onto a laden robotic drive 106. The induct buffer 116 may be a conveyor-based system. In various examples, sensors (e.g., cameras and/or other sensors) may be associated with the induct buffer 116 such that induct buffer level (e.g., data tracking the number of packages bound for each target destination which are in the induct buffer at a given time) may be tracked. The sensors may scan package labels, for example, to determine the packages in the induct buffer 116 and the destination of the packages (e.g., by scanning a shipping label such as a QR code).

Individual packages 102 may be picked by the robotic sortation device 104 from induct buffer 116 and placed on a laden robotic drive 106. The target destination of the package may be known (e.g., as the packages are scanned while in the induct buffer 116 and/or another upstream process) and transmitted wirelessly to the laden robotic drive 106. Scanning may refer to infrared barcode scanning and/or other computer-vision based scanning techniques. The laden robotic drive 106 may be instructed by a control system to take the package to an eject station 130 that is associated with a robotic sortation device 110 that has been allocated to the target destination. For example, each of the storage units 112a, 112b, 112c, may be individually destination pure such that all packages sorted into a single storage unit are bound to the same destination. In an example, the station at which the robotic sortation device 110 is positioned may be able to accommodate four storage units (such as storage units 112a, 112b, 112c). In such an example, the robotic sortation device 110 may be allocated to up to four different target destinations.

Within a sortation facility, there may be a large number of robotic sortation devices 110 and eject stations 130 (e.g., hundreds). The laden robotic drives 106 receive instructions as to which eject station 130 to take a given package to, based on the eject station 130 that has a robotic sortation device 110 that has been assigned to the target destination of the package. There may be multiple such eject stations 130 that have robotic sortation devices 110 that have been assigned to the target destination of a package carried by a laden robotic drive 106. In such examples, the laden robotic drive 106 may be instructed to take the package to the nearest eject station 130 to the induct buffer 116 from which the laden robotic drive 106 received the package. In other examples, the laden robotic drive 106 may be instructed to take the package to the eject station 130 assigned to the target destination based on the relative buffer levels of the different eject buffers 120. In still other examples, the laden robotic drive 106 may be instructed to take the package to the eject station 130 to which the laden robotic drive 106 is predicted to be able to navigate to in the shortest amount of time (among eject stations associated with the target destination) based on current traffic/congestion levels of the laden robotic drives 106. Robotic sortation devices 110 may be associated with processing rate metrics that may indicate an average number of items that a given robotic sortation device 110 can sort per unit of time. Robotic sortation devices 110 and laden robotic drives 106 may be other examples of robots on which firmware releases may be tested using the release qualification tool 202 described below.

The laden drive buffer 118 refers to the number of packages that are currently loaded onto laden robotic drives 106. The laden robotic drives 106 may receive instructions to take the package on a mezzanine (or on a single floor depending on the sortation facility) to an eject station that is associated with a robotic sortation device 110 that has been allocated to the target destination of the package. The eject buffer 120 may be a conveyor based system that receives the packages from laden robotic drives 106 and sends the packages to a lower level of the sortation facility (e.g., via a slide in the example depicted in FIG. 1B) where a robotic sortation device 110 (e.g., a robotic arm) is stationed. Accordingly, the sortation facility in the example of FIG. 1B is a multi-tiered facility with a mezzanine and a lower level. However, in other examples, the processes shown and described may occur on a single level, depending on the facility. The robotic sortation device 110 includes sensors (e.g., cameras, depth sensors, and/or other computer vision sensors) effective to scan a package and determine its target location. The robotic sortation device 110 picks up the package, determines the target destination (e.g., via a label), and places the package into the storage unit 112a, 112b, or 112c that is associated with the target destination. Since the laden robotic drive 106 has been instructed to take the package to the eject station 130 that is associated with the target destination and since the robotic sortation device 110 is currently allocated to that target destination, there should be at least one storage unit 112a, 112b, 112c (etc.) within reach of the robotic sortation device 110 that is allocated for the target destination.

The eject buffer 120 includes sensors to monitor the number of packages that are awaiting sortation by the robotic sortation device 110. As the packages have already been labeled, the various buffers (including the induct buffer 116, the laden drive buffer 118, the eject buffer 120, the recirculation buffer 122, and the cart utilization buffer 124) may store the per-destination count of packages stored in each of the buffers and may send this information (e.g., using any desired communication protocol) to the dynamic allocation controller (e.g., over a computer communication network). Accordingly, the eject buffer 120 may monitor the number of packages stored in the eject buffer 120 per-destination.

The cart utilization buffer 124 may store, for each storage unit (e.g., storage units 112a, 112b, 112c, etc.) that has been positioned at a station with a robotic sortation device 110 (sometimes referred to as a container build station), the package count and/or percentage fullness of each of the storage units. The cart utilization buffer 124 may use cameras, depth sensors, etc., to monitor the number of packages bound to a particular destination that are in a given storage unit. In various examples, the cart utilization buffer 124 may be tracked according to the data tracked by the robotic sortation device 110 in terms of the number and/or class (e.g., size) of packages placed into the storage unit.

Since the storage units are destination pure, all packages in a particular storage unit are destined for the same target destination. The cart utilization buffer 124 represents, on a per-storage unit basis, the relative "fullness" of that storage unit. Since the storage units and/or the packages placed therein may be of known sizes, the relative fullness of the storage units may be determined. Once a particular storage unit has reached a desired threshold utilization (e.g., "fullness" such as measured by a threshold percentage utilization) and/or once the storage unit has been otherwise closed out for removal from the container build station (e.g., due to a time schedule), the storage unit may be removed via a robotic drive 144. Once emptied by a downstream process, an empty storage unit may be returned via a robotic drive 144 to a container build station. In the example shown in FIG. 1B, storage unit 112b is full and has been closed out. Accordingly, a robotic drive 144 removes the storage unit 112b from the container build station. An empty storage unit 112c is returned to the container build station via the robotic drive 144.

Figure 2:
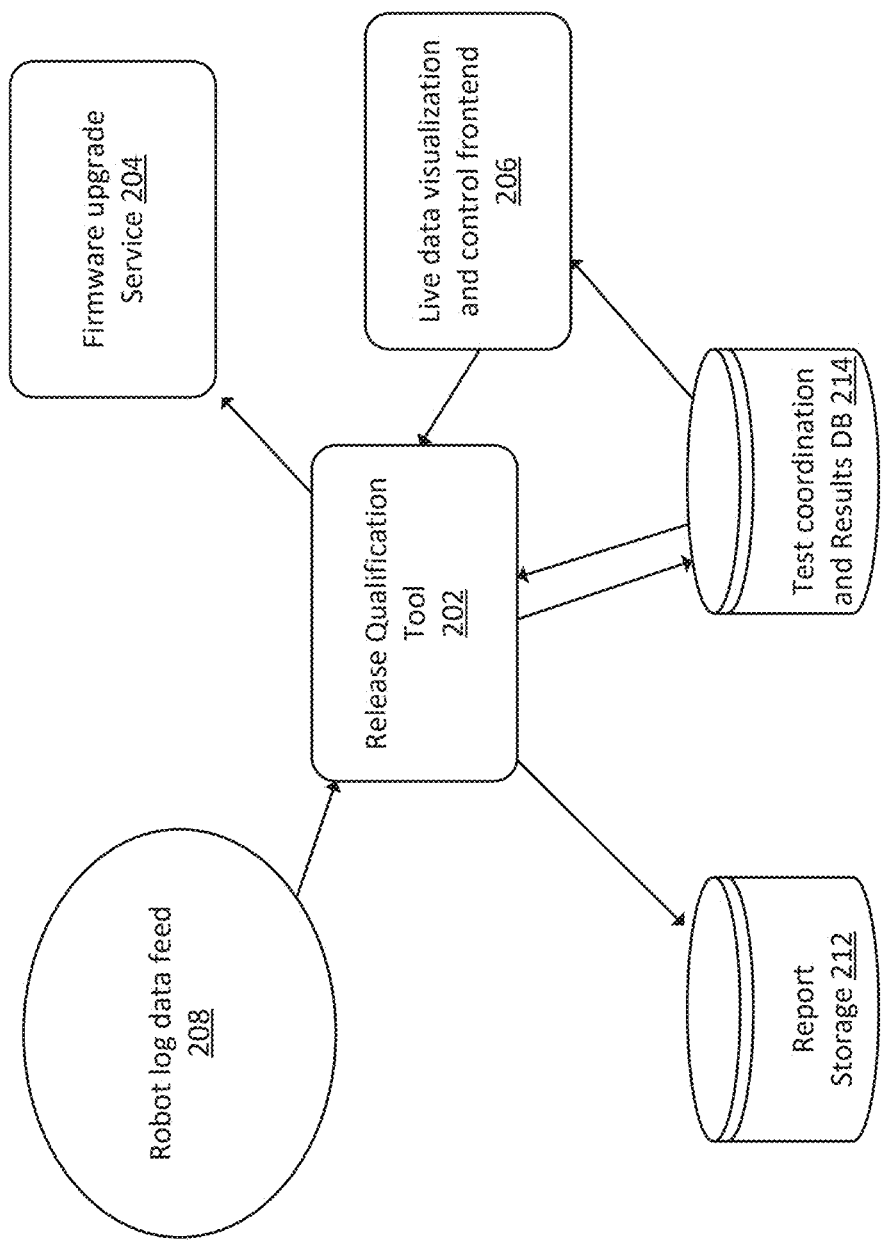
FIG. 2 is a block diagram representing a system for qualifying firmware and/or hardware releases for robotic systems, in accordance with various aspects of the present disclosure.

FIG. 2 is a block diagram representing a system for qualifying firmware releases for robotic systems, in accordance with various aspects of the present disclosure. The release qualification tool 202 may be used to verify that unanticipated changes in robot behavior have not manifested in a firmware release before the new firmware is released fleet-wide. The most readily available diagnosable robot data may be the robot log data (e.g., robot log data feed 208) which may include timestamped events generated by the robots (e.g., robotic drive units) and stored in non-transitory computer-readable memory. Using the robot log data feed 208, critical firmware bugs may be detected. In addition, degraded robot performance may be detected even when such performance would not necessarily be recognizable by engineers/technicians absent the techniques described herein.

The general strategy of the release qualification tool 202 may be to compute the frequency of event occurrence over time for each individual robot in each sample group (e.g., a group of robots from the larger robot population that are selected as the test group and on which the new firmware has been deployed/installed) and then attempt to confirm or refute a hypothesis (that statistically significant behavioral changes have occurred for this particular event (e.g., for a particular log data entry type) (two-tailed evaluation), or that robot behavior has improved or degraded in a statistically significant manner (one-tailed evaluation)).

The specific statistical evaluation techniques used to compare the robot log data events from the test robot samples (representing the test robot behavior with the new firmware) with the corresponding robot log data events from the control robot samples (representing a prior or different version of the firmware) may vary from implementation to implementation. However, some example techniques are described herein for illustrative purposes only. In general, the techniques used to evaluate and compare the log data generated by the test group of robots vs. the control group of robots may vary according to the desired implementation.

Various statistical evaluation tests are now described (including a two-sample, unpaired test). If the distribution of events across the sample populations is not overly skewed, a t-test may be sufficient. However, given that bugs may dramatically disrupt robot event occurrence, and that there exist many robot hardware variances that may impact the frequency of certain errors (e.g., floor camera principle-point and uncompensated distortion may result in more 'poor fiducials'), and that operator-specific actions may inject substantial outliers (e.g., an operator repeatedly restarting a drive over a damaged fiducial may inject hundreds of 'unable to read barcode' events), a non-parametric Wilcoxon rank-sum test (a.k.a. Mann-Whitney U Test) implementation is described below. This implementation may have approximately equivalent performance to the t-test in cases where the distribution of occurrence frequencies are incidentally normal, and should dramatically out-perform t-tests in cases in which the distribution is not normal. Below is an example of a two-sample t-test with unequal sample sizes. In this example, $\text{rank}_1$ and $\text{rank}_2$ represent the sample mean of populations 1 and 2, while $n_1$ and $n_2$ represent the sample sizes of populations 1 and 2, respectively. $sd_1$ and $sd_2$ represent estimates of population variance.

$$t = \frac{\text{rank}_1 - \text{rank}_2}{s_{r_p}\sqrt{\frac{1}{n_1} + \frac{1}{n_2}}}$$

$$s_{r_p} = \sqrt{\frac{(n_1 - 1)(sd_1)^2 + (n_2 - 1)(sd_2)^2}{n_1 + n_2 - 2}}$$

In some examples, the collected data variances may themselves be compared. The injection of a bug that dramatically affect only a subset of the test robot population is in of itself an important observation, even though the high data variance itself may prevent the drawing strong statistical conclusions about the hypotheses. As a backup to our normal hypothesis testing specific events in which there are dramatic differences in data distribution may be flagged. Possibilities for comparing data set variances may include Bartlett's test (generally for normally distributed data), Levene's test, or a Brown-Forsythe test.

$$W = \frac{(N-k)}{(k-1)} \frac{\sum_{i=1}^{k} N_i (Z_i - Z_{..})^2}{\sum_{i=1}^{k} \sum_{j=1}^{N_i} (Z_{ij} - Z_{i.})^2}$$

k=number of groups=2
$N_i$=number of drives in $i^{th}$ group
N=number of all drives in the study
$Y_{ij}$=the value of the $j^{th}$ drive in the $i^{th}$ group
$Z_{ij}=|Y_{ij}-\overline{Y}_i|$ $$Z_i = \frac{1}{N_i} \sum_{j=1}^{N_i} Z_{ij}$$

$$Z_{...} = \frac{1}{N} \sum_{i=1}^{k} \sum_{j=1}^{N_i} Z_{ij}$$

The output of these two calculations may be used to determine whether robot behavior (e.g., for a specific event type indicated in the robot log data feed 208) has improved, worsened, or significantly changed (without indicating that the behavior has worsened or improved).

Advantageously, in some examples, no tuning of per-event thresholds for an alarm system is required (although thresholds may still be used for statistical parameters, such as probability thresholds and effect size). Instead, the behavior of the control group of robots may simply be compared to the test set of robots using the robot log data feed 208. Live data visualization and control frontend 206 may represent data visualizations (such as the example provided in FIG. 3) that may indicate statistically significant robot behavior changes per robot log event type between the different firmware deployments. Results from the statistical analyses performed by the firmware release and release qualification tool 202 may be stored in a test coordination and results database 214. Reports generated showing behavioral changes may be stored in a report storage data store 212. If the release qualification tool 202 indicates improved behavior using the statistical analysis, the firmware upgrade service 204 may push the firmware update to a larger population (e.g., the entire fleet of robots). Conversely, if robot behavior(s) have been determined to have worsened with the candidate firmware release, the test group of robots may be reverted to a prior firmware version and the firmware code may be investigated/modified accordingly.

Before any release is approved, an engineer may use the test report (or the live interface) to validate that no unexpected behavior has been introduced. A normal test might produce a report that is completely blank (no statistically significant changes detected), but in certain circumstances, it may be anticipated and accept the deterioration of certain behaviors. The important point is that the changes are detected and present for easy expert review.

In order to deploy a robot firmware qualification test, an operator may use an interface of the release qualification tool 202 and may select a test environment (e.g., a particular floor of a particular FC or other facility). The number of test drives and/or a duration of runtime may be selected (e.g., a period of time/days). The two firmware releases to compare may be selected. In various examples, one of the firmware releases may default to the currently-deployed firmware for the set of robots. The test may be initiated and the firmware upgrade service 204 may push the firmware release updates to the relevant robots. Event generation may be continuously monitored using the robot log data feed 208 on a per-event, per-drive basis, periodically updating confidence intervals on all monitored events/conditions. At the conclusion of the test, a report may be generated including one or more data visualizations. The robots may be restored to the expected firmware versions.

Figure 3:
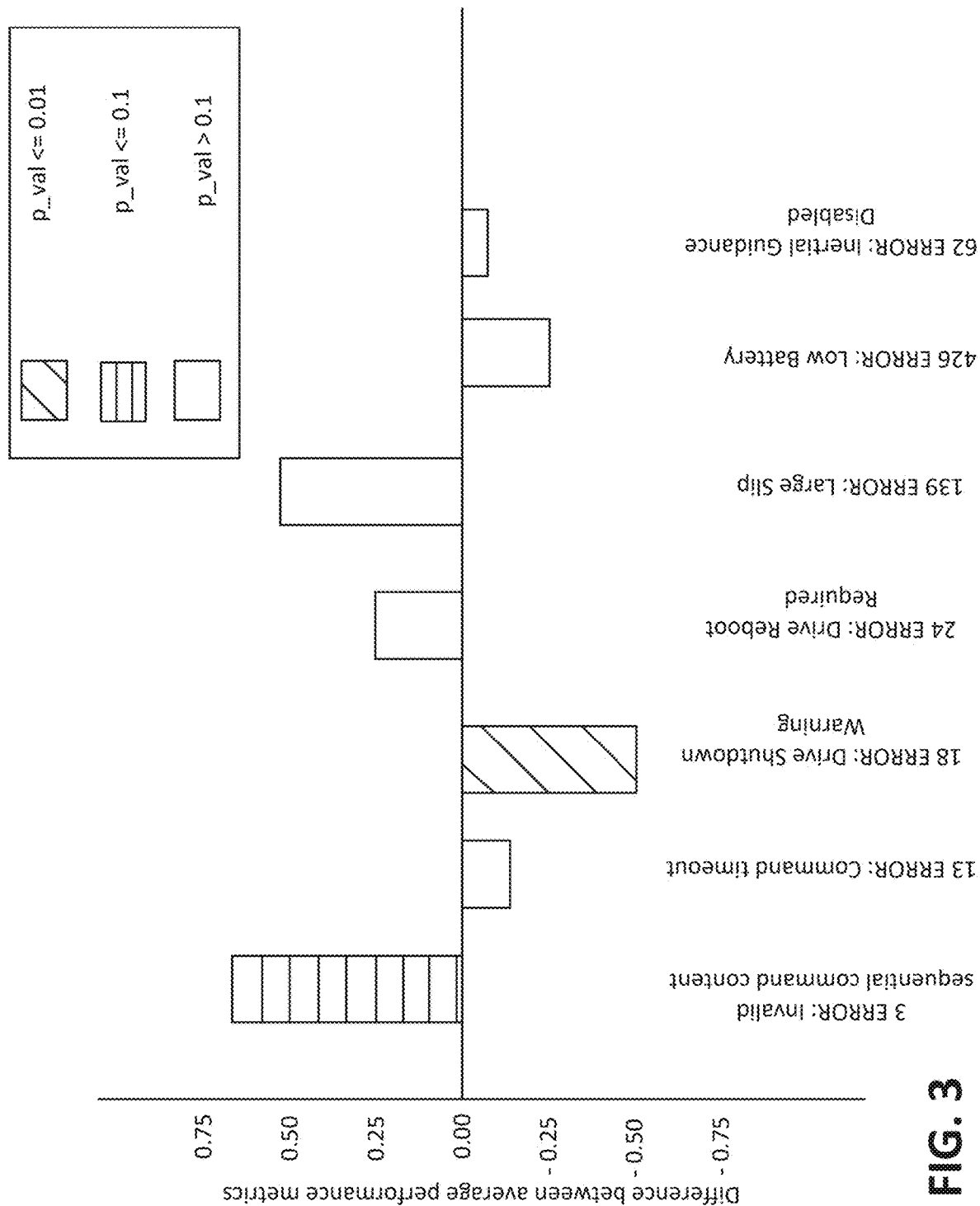
FIG. 3 is a data visualization for assessing statistical significance of robot log data among different robot populations, in accordance with various aspects of the present disclosure.

FIG. 3 is a data visualization for assessing statistical significance of robot log data among different robot populations, in accordance with various aspects of the present disclosure. Along the x-axis of the data visualization, various differences in performance metrics between the two populations are measured. For example, error events (examples of log data entry types), error measurements (e.g., estimates of movement accuracy/error in millimeters (in the x, y floor plane) together with an error in rotation (e.g., in degrees)), and/or other performance metrics are described along with the codes for such performance metrics. These performance metrics may be event types and/or metric evaluations from the log data generated by each robot. Over the time period of the testing, the raw numbers for the relevant performance metrics are determined for each drive of the test population (e.g., the robots on which the candidate firmware release is installed) and the control population. The example error events in FIG. 3 include robotic drive operational errors such as command timeouts, drive shutdown warnings, a slip experienced by a drive (e.g., when rotating), a low battery error, etc. The raw numbers of these performance metrics may be normalized (e.g., number of large slips per million missions). Thereafter, the normalized numbers may be compared between the test and control groups of robots. Increases (positive y-axis values) show an increase in the normalized log event type in the test group compared to the control group. Accordingly, there was an increase in the invalid sequential command content for the test group relative to the control group. Conversely, there was a decrease in the drive shutdown warnings in the test group relative to the control group. It may be that changes to the firmware release deployed on the test group were designed to decrease drive shutdown events and that the resulting decrease is due to this change. However, the increase in invalid sequential command content may be an unanticipated result of the firmware release. This potentially unanticipated result can be seen in the example data visualization shown in FIG. 3. As shown, p-values may be computed to determine whether the null hypothesis that there is no difference between the control and test group can be rejected. P-values less than 0.01 may be statistically significant, while p-values that are above 0.1 may be statistically insignificant. In null-hypothesis significance testing, the p-value is the probability of obtaining test results at least as extreme as the observed results, under the assumption that the null hypothesis is correct. The variance may be determined for each metric to determine the statistical significance for the metric. In various examples, paired testing may be used to account for systematic differences between individual robots to mathematically account for outliers.

Figure 4A:
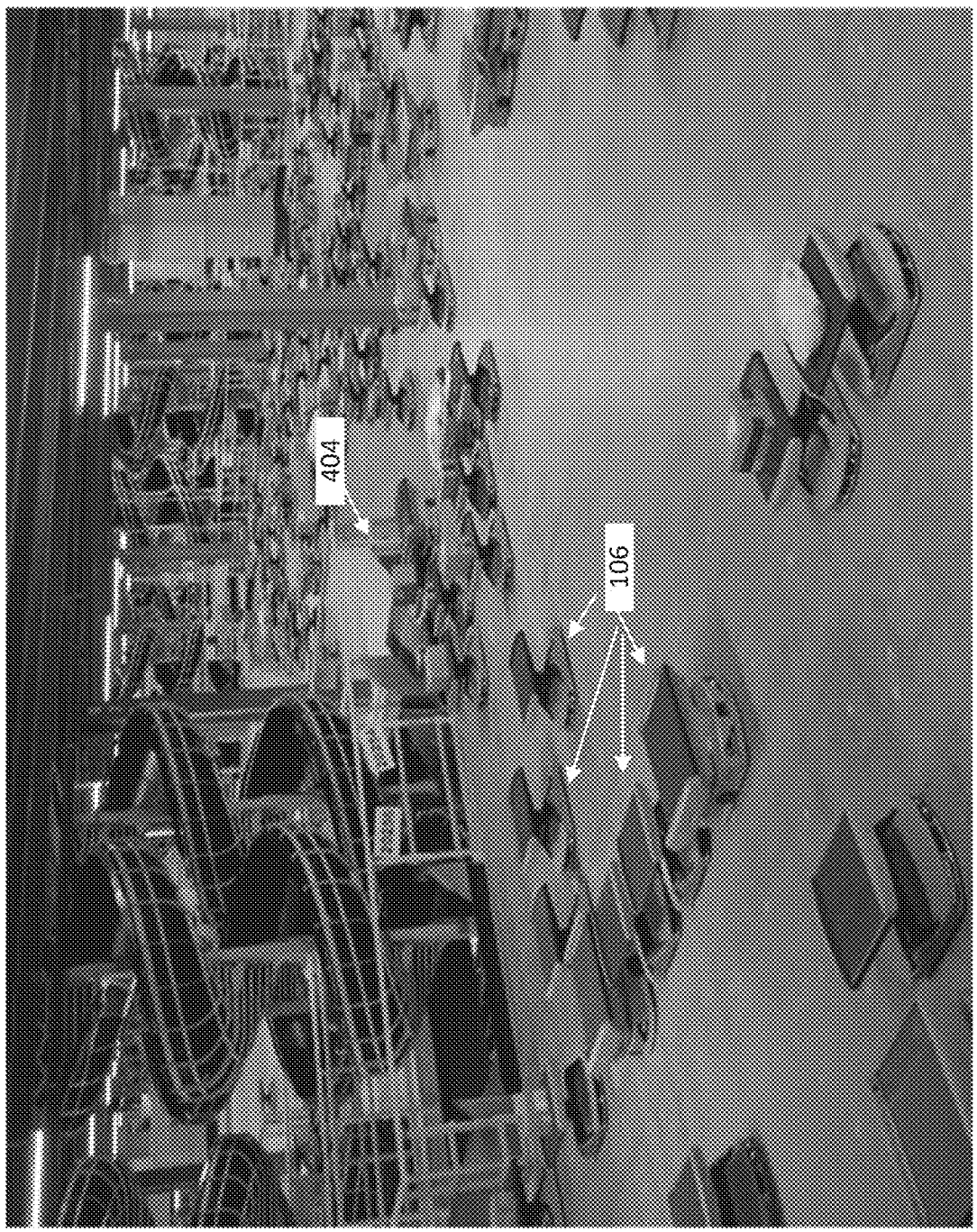
FIG. 4A is an example image depicting laden robotic drives within a sortation facility, in accordance with various aspects of the present disclosure.

FIG. 4A is an example image depicting laden robotic drives 106 within a sortation facility, in accordance with various aspects of the present disclosure. FIG. 4A shows the scale of robotic deployment in an example FC (or other processing facility). In addition, FIG. 4A depicts a different robotic drive unit relative to the robotic drives shown in FIG. 1A. The release qualification tool 202 may be used with any type of robot drive, without limitation. Additionally, the release qualification tool 202 may be used for software deployments generally (not only firmware).

In various examples, the sortation facility depicted in FIG. 4A may be a different type of sortation facility relative to the example sortation facility depicted in FIG. 1B. For example, the sortation facility depicted in FIG. 4A may have more than two floors including the floor on which the laden robotic drives 106 take individual packages to eject stations 404 (that are associated with the target destination for such packages).

An eject station 404 is shown in FIG. 4A, for illustrative purposes. When a particular laden robotic drive 106 is loaded with a package with a known target destination, the laden robotic drive 106 may be controlled to proceed to an eject station 404 that is associated with a robotic sortation device that has been allocated to sort packages bound for the target destination into a destination pure container.

Figure 4B:
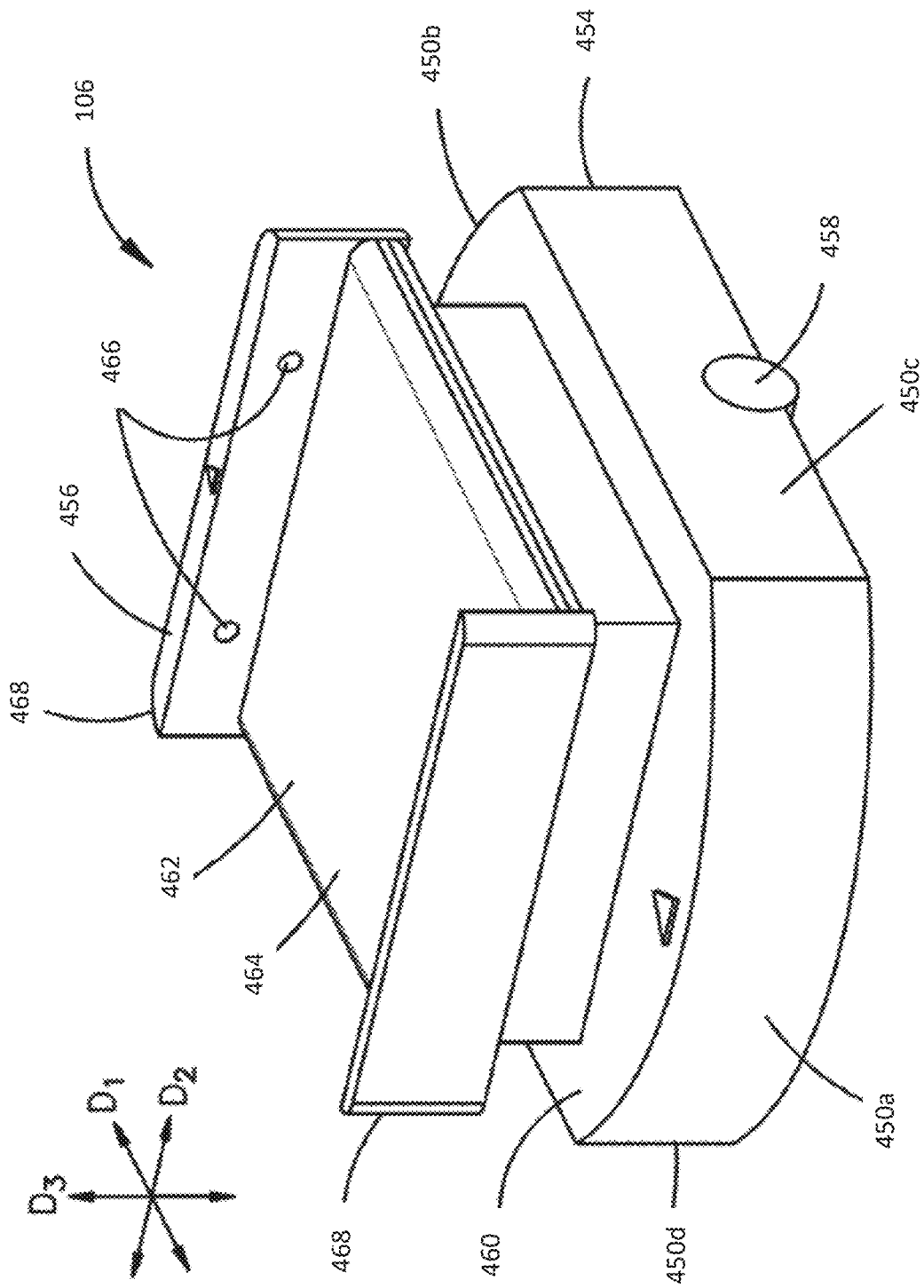
FIG. 4B is an example image of one of the laden robotic drives of FIG. 4A, in accordance with an example aspect of the present disclosure.

FIG. 4B is an example image of one of the laden robotic drives of FIG. 4A, in accordance with an example aspect of the present disclosure. Each laden robotic drive 106 may be mobile drive unit which may be an autonomous or semi-autonomous robot that travels on a floor of the warehouse guided by, for example, fiducial markers in or on the floor. In this manner, laden robotic drives 106 may follow a grid-like pattern to traverse from a starting point to a destination point, such as a drop-off location for a package. Each laden robotic drive 106 can include a first end 450a and a second end 450b that are spaced from one another along a first direction D1. Each laden robotic drive 106 can include a first side 450c and a second side 450d that are spaced from one another along a second direction D2, which is perpendicular to the first direction D1. Each laden robotic drive 106 can include and upper end and a lower end that are spaced from one another along a third direction D3, which is perpendicular to the first direction D1 and the second direction D2. The third direction D3 can be a vertical direction.

Each laden robotic drive 106 includes a vehicle chassis 454. Each chassis 454 supports a payload carrier 456 that is configured to carry a package (or other payload) thereon. The chassis 454 includes at least one pair of wheels 458. Each laden robotic drive 106 can include a motor (not shown) that is configured to drive at least one of the wheels 458 in response to control signals so as to rotate the at least one of the wheels 458, thereby causing the laden robotic drive 106 to move along a floor. The wheels 458 can be driven at the same speed as one another so as to move the mobile drive unit 450 forward or backward along the first direction D1. The speed and/or direction of at least one of the wheels 458 can be varied from that of the other wheel or wheels 458 so as to cause the mobile drive unit 450 to rotate in place or turn. Optionally, the chassis 454 can also include one or more casters (not shown) that are configured to contact the floor under the laden robotic drive 106.

The wheels 458 of each pair can be spaced opposite from one another along the second direction D2, such as at opposite sides of the chassis 454, or can be disposed at any other suitable location of the chassis 454. In one example as shown, the chassis 454 can include a single pair of wheels 458 that are at approximately a midpoint of the laden robotic drive 106 between the first and second ends with respect to the first direction D1. Each laden robotic drive 106 can include a cover 460 that is affixed to the chassis 454. The cover 460 can have cut-out portions that form wheel cut-outs for the wheels 458 to extend through.

The payload carrier 456 of each laden robotic drive 106 can include a conveyor system 462. The conveyor system 462 can include a conveyor surface 464 that can be defined by at least one such as a plurality of rotating conveyor elements. The rotating conveyor elements can include a conveyor belt, wire mesh, one or more rollers or balls, any other suitable rotating conveyor element, or any suitable combination of rotating conveyor elements. The conveyor surface 464 can be configured to rotate relative to the chassis 454 so as to move payloads supported thereon along the second direction D2. However, it will be understood that in alternative embodiments, the conveyor surface 464 can be configured to move payloads along the first direction D1.

The conveyor system 462 can include one or more sensors 466, such as (without limitation) photo-eyes or light curtains, that are configured to detect the presence and/or location of payloads on conveyor surface 464. The number of sensors 466 can be selected based on variability of the speed of the mobile drive units. Rotation of the conveyor elements can be controlled based on the whether or not a payload is detected on the conveyor surface 464. For example, rotation of the conveyor elements can be stopped when the one or more sensors 466 detect that a payload has been received on the conveyor surface 464. The laden robotic drive 106 can further rotate the conveyor surface 464 so as to reposition the payload on the conveyor surface 464 in the event that the sensors 466 detect that the payload is hanging off of the conveyor surface 464. Optionally, the conveyor system 462 can include sidewalls 468 that extend vertically upwards relative to the conveyor surface 464 so as to prevent payloads (e.g., packages) from falling off the ends of the laden robotic drive 106 during transport.

Figure 4C:
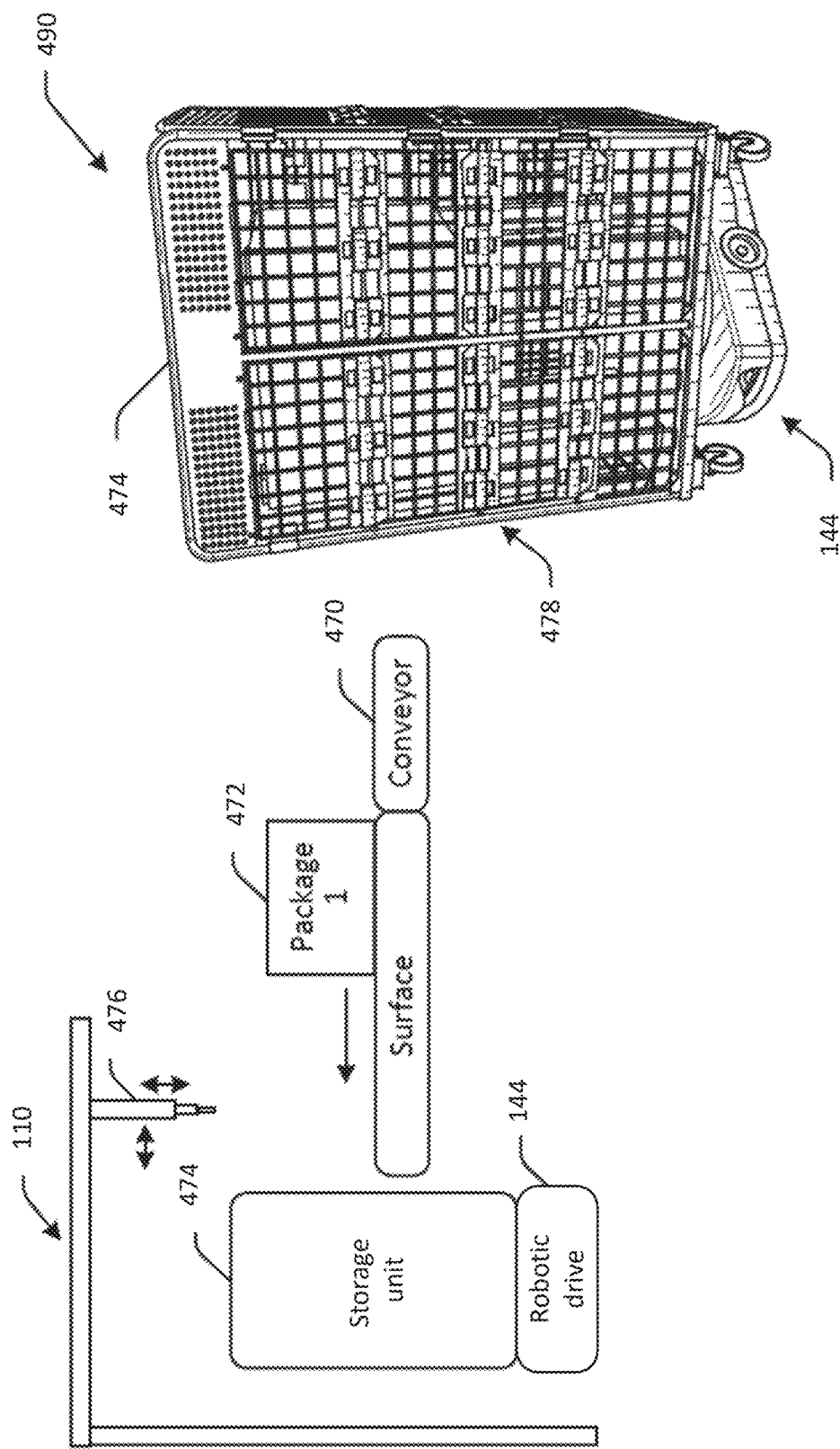
FIG. 4C is a diagram of a robotic sortation device that sorts items into target containers, in accordance with various embodiments described herein.

FIG. 4C is a diagram of a robotic sortation device 110 that sorts items into target containers such as mobile storage units (e.g., carts), in accordance with various embodiments described herein. In FIG. 4C, a conveyor 470 may be used to transport packages 472. The packages 472 may be diverted onto one or more surfaces to await placement into different corresponding containers (e.g., moveable storage unit 474). In some instances, the conveyor 470 may be elevated with respect to the storage units 474. The packages 472 may be diverted using arms or bars that are automatically controlled.

As depicted in a side view, the robotic sortation device 110 may be positioned adjacent to the first storage unit 474. The robotic sortation device 110 may include a robotic manipulator 476 that is configured to grasp packages from the corresponding surface and to move the package into the first storage unit 474. The robotic manipulator 476 may include a linear actuator and/or telescoping arm with an end of arm tool that is used to grasp packages of different shapes, sizes, weights, and so forth. In other examples, the robotic manipulator 476 may instead by at the end of a hinged crane-like arm that may be controlled to grasp packages and place the packages into a destination pure container for which the robotic sortation device has been allocated in accordance with the various techniques described herein. The robotic manipulator 476 may have three degrees of freedom. For example, the robotic manipulator 476 may be configured to move the X-, Y-, and Z-axis directions. In some examples, the robotic manipulator 476 may not be able to rotate along a central axis of the actuator or telescoping arm, so as to simplify hardware. The robotic manipulator 476 may be coupled to a support that is coupled to a floor of the facility, or a support that is coupled to a moveable base, or to another type of support. If the robotic manipulator 476 is coupled to a moveable support instead of a permanent fixture, the robotic manipulator 476 may be used to service different moveable carts by repositioning the robotic manipulator 476. The robotic manipulator 476 may be configured to access the first storage unit 474 from a topside, or from above, without requiring the doors of the first cart to be opened, thereby further simplifying the loading process.

The robotic sortation device 110 may include a robotic drive 144 disposed at least partially under the first storage unit 474. The robotic drives 144 may be part of an autonomous robot. The robotic drives 144 may be configured to rotate the first storage unit 474 in different directions. Because the robotic drives 144 can rotate the first storage unit 474, rotational ability may not be needed at the robotic manipulator 476. However, in other examples, the robotic sortation device may rotate 360 degrees to place packages into different storage units at the container build station. The robotic drives 144 may be disposed under an individual container. Different robotic platforms may be used for different containers.

As depicted in isolated view 490, the first storage unit 474 may have doors 478 that can open by swinging outwards. Because the robotic manipulator 476 can access the first storage unit 474 from above or from a topside, the doors 478 can remain closed during loading. The robotic manipulator 476 may be a moveable robotic manipulator that can be moveably positioned adjacent to different carts. As previously described, the robotic sortation device 110 may be positioned at a container build station. There may be designated positions for robotic drives 144 to bring storage units 474 to the container build station. Each storage unit 474 may be designated to a target destination for which the robotic sortation device 110 has been allocated. Accordingly, the robotic sortation device 110 may place packages bound for a particular target destination into the mobile storage unit that is associated with that target destination. When the storage unit is full (e.g., above a threshold cart utilization), the robotic drive 144 may remove the storage unit and a different robotic drive 144 may bring an empty storage unit for further container build operation.

The robotic sortation device 110 may be in communication with one or more sensors, such as cameras, used to capture images of the contents of the first storage unit 474 and/or to determine the target destination for a particular package. The image data may be used to determine positioning for a package and/or to scan labels of the package to identify the target destination for a package so that the robotic sortation device may place the package into a destination pure container for which the robotic sortation device has been allocated. The package may be positioned in the predetermined position via movement of the robotic manipulator 476 after the package is grasped. Additionally, sensors such as the one or more cameras may monitor the storage units "fullness" to determine the cart utilization.

The robotic sortation device 110 may include an autonomous robot controlling the robotic arm. The robotic drive 144 may be configured to rotate storage units (e.g., carts) from a first orientation to a second orientation. The robotic drive 144 may be configured to rotate carts at least 180 degrees. The robotic sortation device 110 may include the robotic manipulator 476 that has a linear actuator or other actuator and an end of arm tool. The robotic manipulator may be configured to (i) retrieve a first package from a first surface and to position the first package inside the first cart at a first predetermined position without opening the first door, and (ii) retrieve a second package from a second surface and to position the second package inside the second cart at a second predetermined position without opening the second door. The robotic manipulator 476 accesses the carts from a top side. The robotic sortation device 110 may include or may be in communication with, a first camera configured to image an interior of the first cart, and a second camera configured to image an interior of the second cart.

Figure 5:
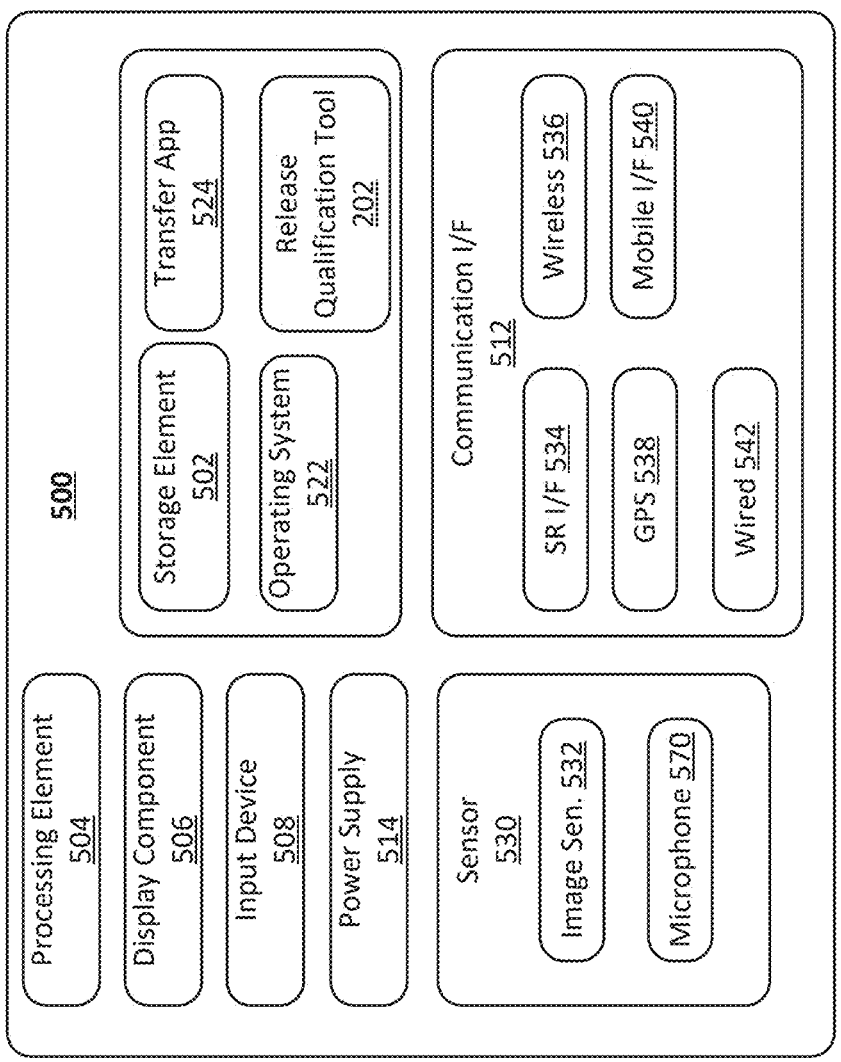
FIG. 5 is an example computing device architecture that may be used in accordance with various techniques described herein.

FIG. 5 is a block diagram showing an example architecture 500 of a computing device that may be used in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store computer-executable instructions configured to implement the release qualification tool 202 described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses) that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 6:
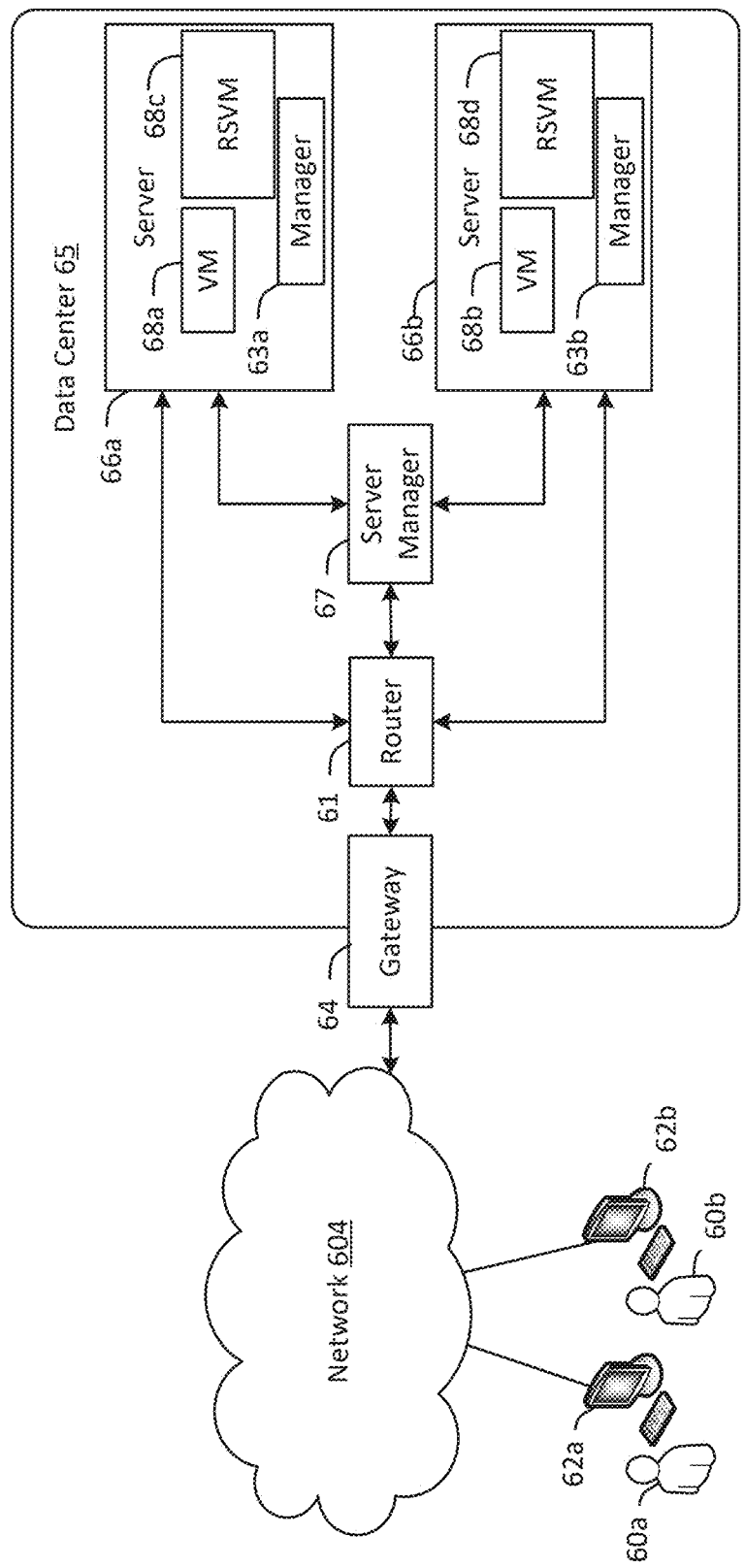
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to implement the release qualification tool 202 as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
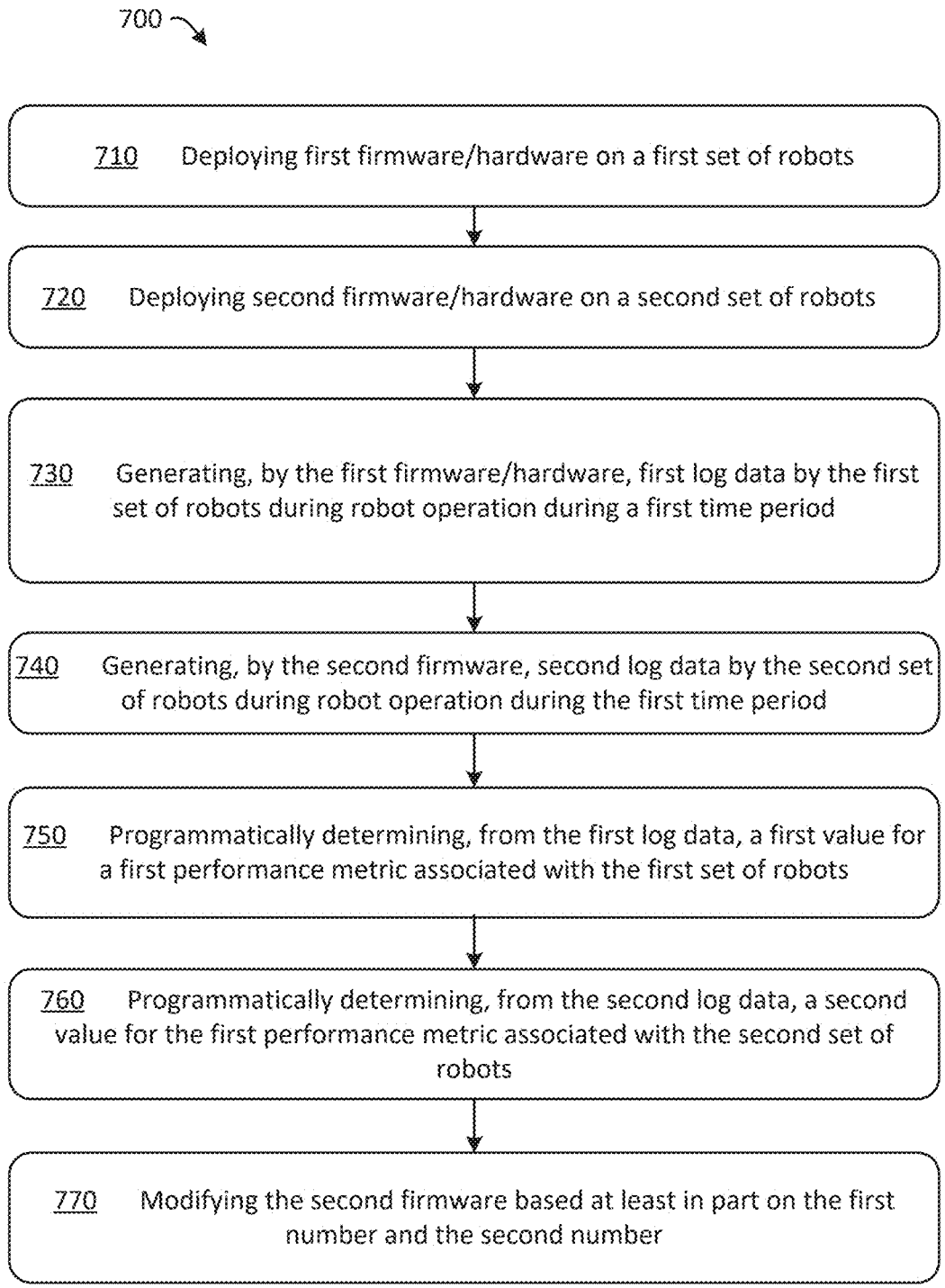
FIG. 7 is a flowchart describing an example process for qualification for robotic firmware and/or hardware releases, according to various aspects of the present disclosure.

FIG. 7 is a flowchart describing an example process 700 for qualification for robotic firmware releases, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which first firmware may be deployed on a first set of robots. Deploying the firmware may include sending data representing the first firmware to the first set of robots and installing the first firmware on each robot of the first set of robots. Processing may continue at action 720, at which second firmware may be deployed on a second set of robots. Deploying the firmware may include sending data representing the second firmware to the second set of robots and installing the second firmware on each robot of the second set of robots.

Processing may continue at action 730, at which the first firmware may generate first log data for the first set of robots during robot operation during a first time period. The first log data may describes events such as informational notices (e.g., time-stamped actions taken by the robot, battery levels, etc.), warnings (e.g., battery temperature high, battery level low, etc.), and errors (e.g., loss of communication with server, drive errors, navigational or operation errors, etc.) experienced by each robot of the first set of robots during robot operation for the first time period. Processing may continue at action 740, at which the second firmware may generate second log data for the second set of robots during robot operation during the first time period.

Processing may continue at action 750, at which a first value for a first performance metric may be programmatically determined from the first log data. The first value may be determined from the first log data for each distinct robot of the first set of robots. The first value may be, for example, normalized metric data such as a normalized number of events of a particular type experienced by the first set of robots, a normalized amount of energy consumed per mission, an average mission completion time, average error, etc.

Processing may continue at action 760, at which a second value for the first performance metric may be programmatically determined from the second log data. The second value may be determined from the second log data for each distinct robot of the second set of robots. Thereafter, the first value may be compared to the second value to determine if there is statistically different robot performance or behaviors between the first set of robots executing the first firmware (or deployed with first hardware) and the second set of robots executing the second firmware (or deployed with second hardware). For example, it may be determined that the first set of robots experienced a statistically significant increase in the number of command timeouts relative to the second set of robots, while the second set of robots experienced a statistically significant increase in the number of large slips relative to the first set of robots, etc.

Processing may continue at action 770, at which the second firmware may be modified based at least in part on the first value and the second value. For example, the second firmware may be modified prior to a fleet-wide release to correct for any behavioral/performance degradations determined using the statistical evaluation by the release qualification tool 202.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
deploying a plurality of robotic drive units across a plurality of robotic processing facilities, wherein the first set of robotic drive units have first firmware installed;
installing second firmware on a first subset of the plurality of robotic drive units;
generating log data for the plurality of robotic drive units over a first period of time, wherein the log data describes events associated with operation of the plurality of robots during the first period of time;
determining a first event type of the log data, the first event type relating to a navigation error;
determining a first number of instances of the first event type experienced by the first subset of the plurality of robotic drive units over the first period of time;
determining a second number of instances of the first event type experienced by robotic drive units of the plurality of robotic drive units that are not in the first subset;
determining, using the first number and the second number, that the first subset of the plurality of robotic drive units experienced a statistically significant increase in events of the first event type; and
modifying the second firmware in response to the first subset of the plurality of robotic drive units experiencing a statistically significant increase in events of the first event type.

2. The method of claim 1, further comprising:
generating third firmware based on the modification of the second firmware;
installing the third firmware on a second subset of the plurality of robotic drive units, wherein the second subset comprises a greater percentage of the plurality of robotic drives than the first subset; and
generating second log data for the plurality of robotic drive units over a second period of time.

3. The method of claim 2, further comprising:
determining, from the second log data, a third number of instances of the first event type experienced by the second subset of the plurality of robotic drive units over the second period of time;
determining, from the second log data, a fourth number of instances of the first event type experienced by robotic drive units of the plurality of robotic drive units that are not in the second subset;
determining, using the third number and the fourth number, that the third firmware did not result in a statistically significant increase in events of the first event type; and
installing the third firmware on the plurality of robotic drive units.

4. A method comprising:
deploying at least one of first firmware or first hardware on a first set of robots, wherein the first set of robots are deployed across a plurality of processing facilities;
deploying at least one of second firmware or second hardware on a second set of robots, wherein the second set of robots are deployed across the plurality of processing facilities;
generating, based at least in part on the first firmware or the first hardware, first log data by the first set of robots during robot operation during a first time period;
generating, based at least in part on the second firmware or the second hardware, second log data by the second set of robots during the first time period;
programmatically determining, from the first log data, a first value for a first performance metric associated with the first set of robots;
programmatically determining, from the second log data, a second value for the first performance metric associated with the second set of robots; and
modifying the second firmware or the second hardware based at least in part on the first value and the second value.

5. The method of claim 4, further comprising deploying the first set of robots and the second set of robots to perform a common set of operations within a shared operating zone during the first time period.

6. The method of claim 4, wherein the first log data entry type represents an event related to robot navigation or robot locomotion.

7. The method of claim 4, further comprising:
determining, using the first value of the first performance metric and the second value of the first performance metric, that there is a statistically significant difference in performance of the first set of robots and the second set of robots, wherein the modifying the second firmware is based on the difference in performance.

8. The method of claim 4, further comprising:
deploying the second set of robots across a plurality of different processing environments during the first time period;
generating a third set of robots by increasing a number of robots in the second set of robots;
deploying the second firmware on the third set of robots; and
deploying the third set of robots across the plurality of different processing environments during a second time period.

9. The method of claim 4, further comprising:
normalizing the first value of the first performance metric and the second value of the first performance metric for a selected number of robot missions; and
determining a difference between average values of performance metrics for the first log data entry type based on multiple samples of the second set of robots.

10. The method of claim 4, wherein the first log data is generated by the first set of robots during operation and wherein the first log data comprises entries representing one or more of drive errors, warnings, and informational events.

11. The method of claim 4, further comprising:
reverting the second set of robots to the first firmware or the first hardware based on the first number and the second number; and
programmatically designating the second firmware or the second hardware for modification.

12. The method of claim 4, further comprising:
determining, using the first log data, a relative change in a number of navigational or operational errors between the first set of robots and the second set of robots; and
deploying the second firmware or the second hardware on the first set of robots based on the relative change.

13. A system comprising:
a first set of robots;
a second set of robots;
at least one processor; and
non-transitory computer-readable memory storing instructions that, when executed by the at least one processor is effective to:
deploy at least one of first firmware or first hardware on the first set of robots;

deploy at least one of second firmware or second hardware on the second set of robots;
generate, based at least in part on the first firmware or the first hardware, first log data by the first set of robots during robot operation during a first time period;
generate, based at least in part on the second firmware, second log data by the second set of robots during the first time period;
programmatically determine, from the first log data, a first value for a first performance metric associated with the first set of robots;
programmatically determine, from the second log data, a second value for the first performance metric associated with the second set of robots; and
modify the second firmware or the second hardware based at least in part on the first value and the second value.

14. The system of claim 13, the non-transitory computer-readable memory storing further instructions that, when executed by the at least one processor, are further effective to:
deploy the first set of robots and the second set of robots to perform a common set of operations within a shared operating zone during the first time period.

15. The system of claim 14, wherein the first log data entry type represents an event related to robot navigation or robot locomotion.

16. The system of claim 13, the non-transitory computer-readable memory storing further instructions that, when executed by the at least one processor, are further effective to:
determine, using the first value for the first performance metric and the second value of the first performance metric, that there is a statistically significant difference in performance of the first set of robots and the second set of robots, wherein the modifying the second firmware is based on the difference in performance.

17. The system of claim 13, the non-transitory computer-readable memory storing further instructions that, when executed by the at least one processor, are further effective to:
deploy the second set of robots across a plurality of different processing environments during the first time period;
generate a third set of robots by increasing a number of robots in the second set of robots;
deploy the second firmware on the third set of robots; and
deploy the third set of robots across the plurality of different processing environments during a second time period.

18. The system of claim 13, the non-transitory computer-readable memory storing further instructions that, when executed by the at least one processor, are further effective to:
normalize the first value of the first performance metric and the second value of the first performance metric for a selected number of robot missions; and
determine a difference between average values of performance metrics for the first log data entry type based on multiple samples of the second set of robots.

19. The system of claim 13, wherein the first log data is generated by the first set of robots during operation and wherein the first log data comprises entries representing one or more of drive errors, warnings, and informational events.

20. The system of claim 13, the non-transitory computer-readable memory storing further instructions that, when executed by the at least one processor, are further effective to:
determine, using the first log data, a relative change in a number of navigational or operational errors between the first set of robots and the second set of robots; and
deploy the second firmware or the second hardware on the first set of robots based on the relative change.

* * * * *